Nov. 29, 1938.    E. B. MALLORY    2,138,349
METHOD AND APPARATUS FOR AERATING SEWAGE
Filed Feb. 10, 1936    4 Sheets-Sheet 3
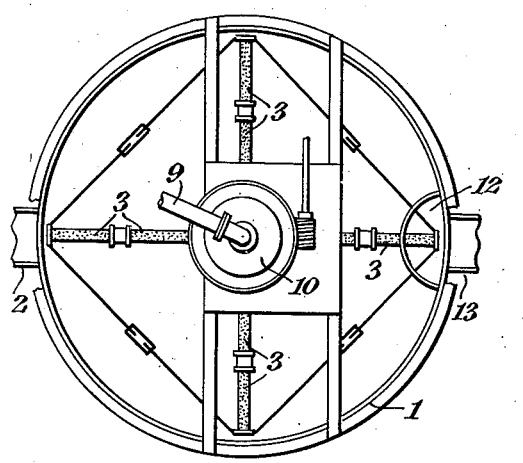
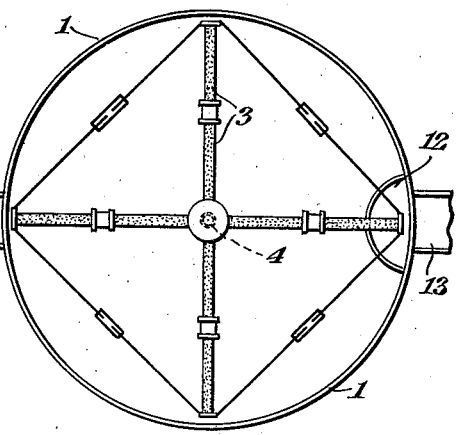
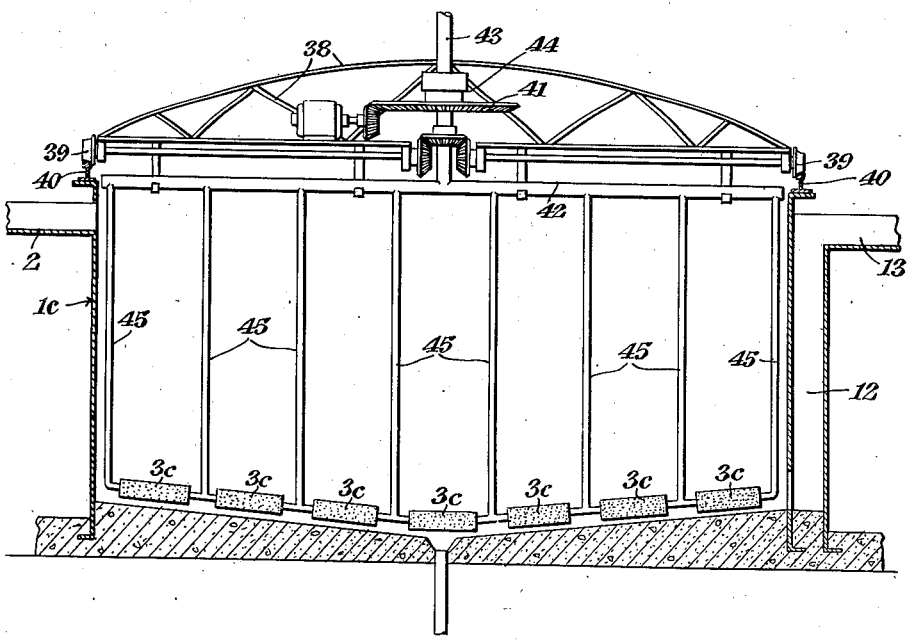
INVENTOR
Edward B. Mallory
BY
Ward, Crosby & Neal
ATTORNEYS

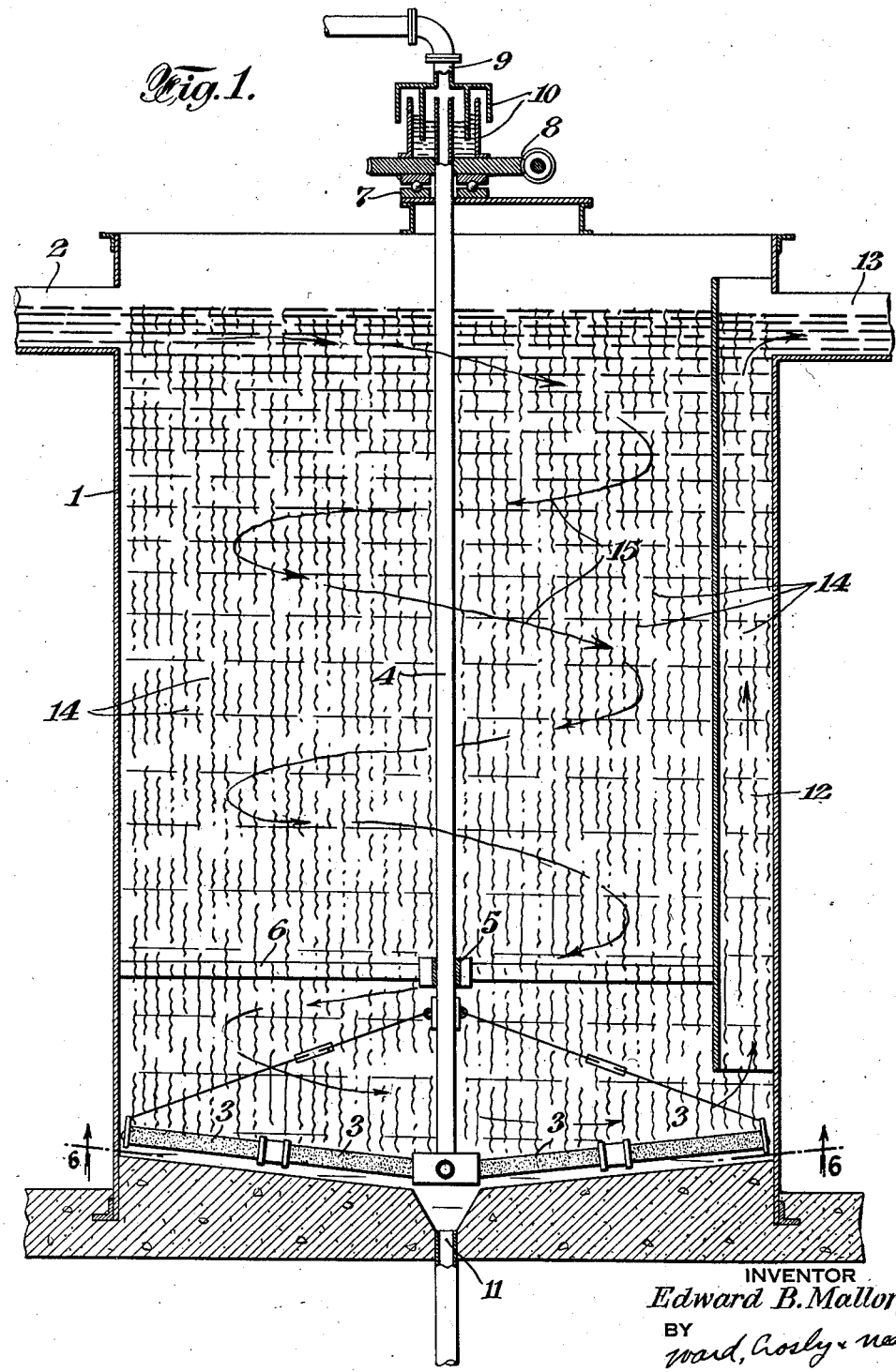

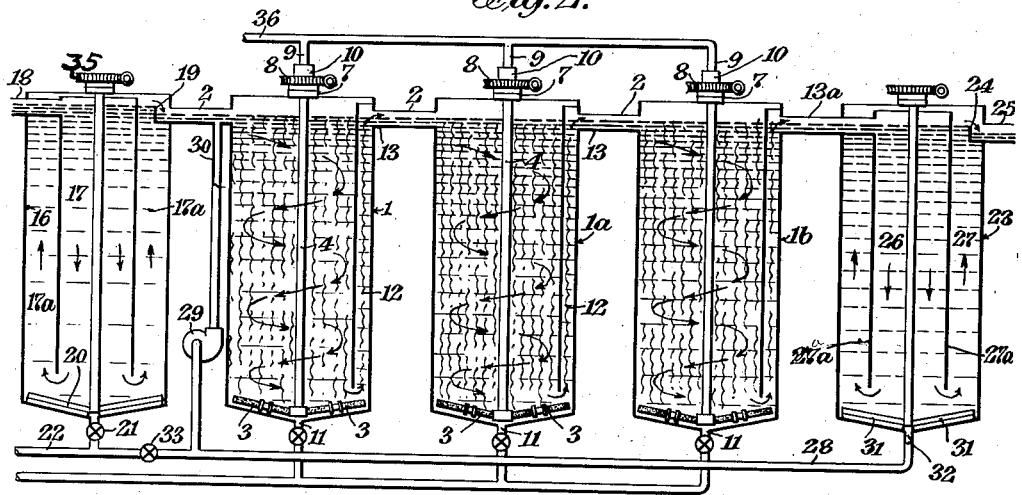

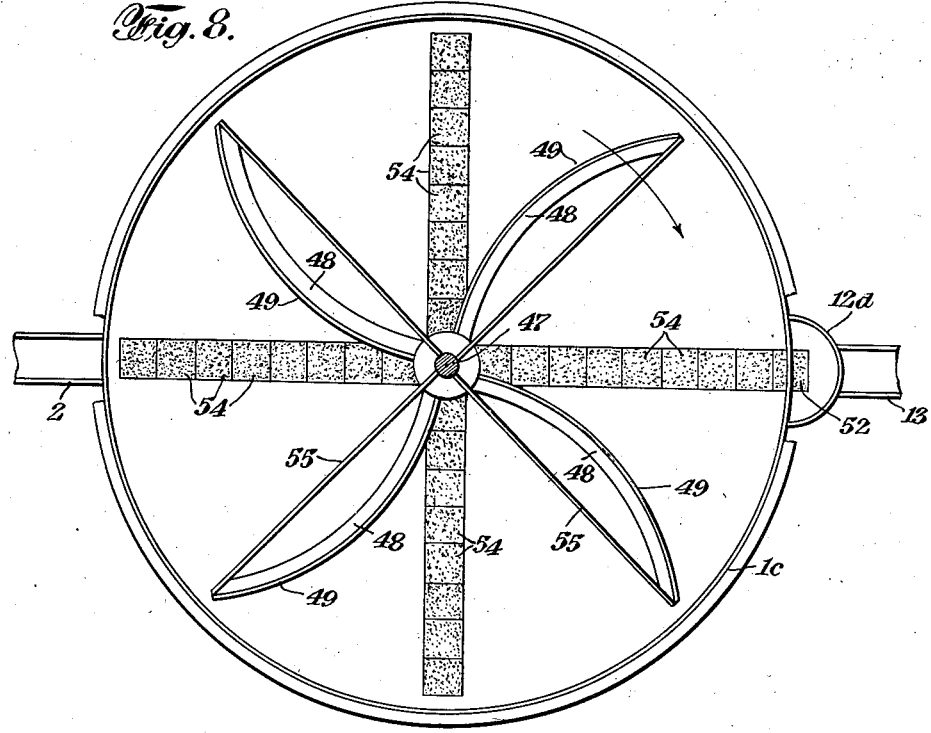
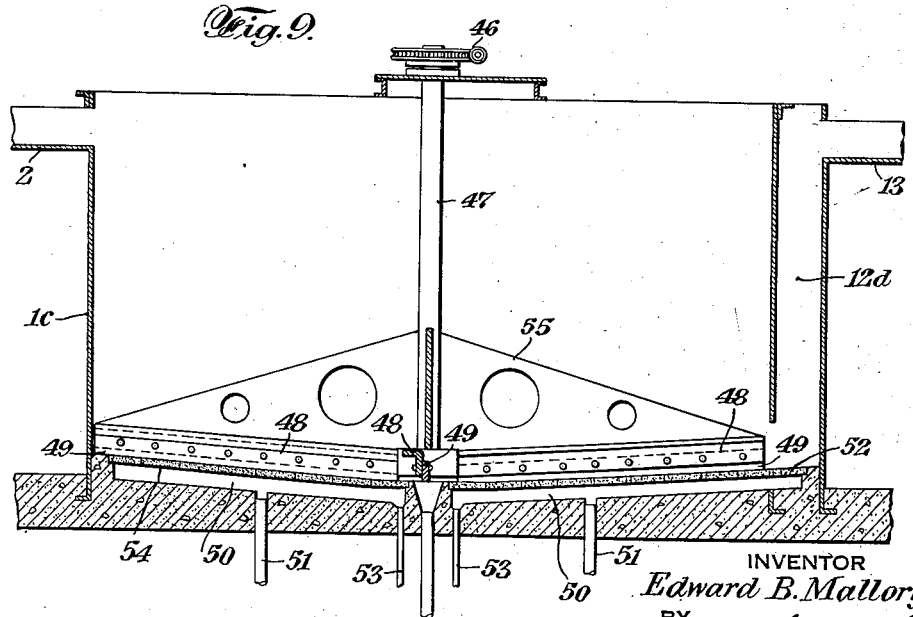

Patented Nov. 29, 1938

2,138,349

UNITED STATES PATENT OFFICE 2,138,349

METHOD AND APPARATUS FOR AERATING SEWAGE

Edward B. Mallory, Tenafly, N. J.

Application February 10, 1936, Serial No. 63,123

13 Claims. (Cl. 210—8)

In the treatment of sewage by various oxidation or chemical precipitation processes such as the so-called "activated sludge process", as in Jones Patent No. 1,282,587, dated October 22, 1918, the chemical precipitation process, as in Gleason and Loonan Patent No. 1,886,267, dated April 18, 1932, or the "oxidized sludge" process, as in my co-pending application Ser. No. 668,217, filed April 27, 1933, entitled "Oxidized sludge sewage treatment process", an important step consists in aerating and flocculating the sewage or a mixture of sewage and sludge returned from the settling chamber, by agitation in the so-called aerator or flocculator, to expedite oxidation and other chemical and physical reactions incident to the oxidation, agglomeration and precipitation of the suspended solids, and the conversion of the unstable dissolved solids to more stable forms.

The degree of purification depends to a considerable extent upon three important factors: first, the quality and sufficiency of sludge floc to provide a suitable surface for the adsorption of the colloidal suspensions in the sewage and an adequate interface at which certain chemical reactions may occur; second, the adequacy of mixing to insure contact between the sewage and sludge floc surfaces; and third, the sufficiency and adequate distribution of oxygen in dissolved form to properly support the chemical reactions taking place during the recurring cycles of agitation and quiescence.

In my copending application Ser. No. 668,217 I have shown methods of determining and providing the necessary quality and sufficiency of sludge floc; this invention relates to new and more efficient methods and apparatus for providing adequate mixing and oxygenation.

For many years two general types of mixing and oxygenation equipment have been employed, one type mechanically agitating and circulating the contents of the aerator; and the other bubbling air through the contents of the aerator. Combinations of the two methods have sometimes been used.

This invention relates more particularly to the method in which air is bubbled through the aerator contents (the mixture of sewage and sludge floc, generally termed "mixed liquor").

In the use of conventional forms of aeration tanks of the so-called spiral flow type as in Jones Patent Re. No. 19,577, it has been learned through years of practice and experimentation that inefficiencies arise through the failure of the structure to uniformly agitate the tank contents and deliver uniformly distributed air therethrough. This has been frequently referred to in the art as "short circuiting", and is due to the formation of a central revolving core of mixed liquor which is not adequately aerated. It is now possible to compute with reasonable accuracy the extent of this loss of efficiency and to confirm such computations by experimentation. For example, in a horizontally disposed aerator of the so-called spiral flow type, the extent of the revolving inactive core may vary from approximately 40% to approximately 60% of the total cross sectional area of the tank, depending upon the tank contour and character and rate of air diffusion, with the result that the effective agitation and aeration is reduced to approximately this same extent. It has been shown that the effectiveness of aeration in a spiral flow tank having a displacement diffusion period of approximately 8 hours may be reproduced or equalled in 4 hours by employing the methods and apparatus of the present invention. It has further been shown by test that increasing the rate of air flow through the diffuser plates in a spiral flow tank increases the effective cross sectional area of the above-mentioned central inactive core. Therefore, the effectiveness of aeration is not increased in proportion to the amount of air applied. To mitigate this loss of efficiency in tanks of the spiral flow type, it has been customary to provide considerably greater air diffusion plate area, with a consequent increase in the cost of operation, since the cost of compressing air for the purposes of aeration is the greatest individual cost in a purification cycle of this type. In existing plants employing the spiral flow type of aerator, the ratio of cubic feet of liquid holding capacity of the tanks per square foot of diffuser area is relatively low, many typical examples varying from 60:1 to 175:1. In accordance with the present invention and employing, for example, a tank 21 feet in diameter and 20 feet deep, the ratio of cubic feet of liquid holding capacity per square foot of diffuser area may be, for example, 395:1; and employing a tank 31 feet in diameter having a liquid depth of 20 feet, this ratio may be further increased. Therefore, great savings in operating costs may be effected.

It is a broad object of my invention to enable greater numbers of sludge particles to be brought into intimate association with a greater number of individual portions of sewage, and at the same time to bring adequate quantities of dissolved oxygen into intimate association with a greater number of sludge particles and quantities of sewage with better uniformity, and at the same time to provide a thorough and uniform distribution of air throughout the mixed liquor; this amount of air being at all times preferably somewhat in excess of that required to supply the dissolved oxygen demand, thereby insuring in every part of the mixed liquor a superfluity of dissolved oxygen over and above the amount required to support the maximum rate of chemical reaction.

In the preferred form of my invention I pass the diffusing medium periodically under different superjacent columns of liquid in the tank, thereby providing successive columns of bubbles rising through various zones of the liquid at a frequency which may be varied to meet requirements.

In an alternate form I maintain the air diffusion means in fixed position and rotate the liquid contents of the tank in spiral fashion over this diffusion medium in such manner that similar results are accomplished. To avoid the permanent lodgment of settled solids in the zones between diffusion mediums, I may employ in conjunction with this alternate form a suitable sludge scraping mechanism to periodically sweep the solids which may have settled on the tank floor out of such zones to points over the diffusers, where the rising column of air bubbles again circulates these suspended solids through new volumes of sewage. This alternate form is particularly adapted for use in plants designed for relatively low mixed liquor solids concentrations, and tanks of relatively large diameter. It is also particularly adaptable to plants designed for a sludge quality which at optimum has a relatively slow rate of settling, and in which the chemical reactions occurring during quiescent periods require a relatively longer time because of this particular sludge quality, and by reason of the lower suspended solids concentrations.

In the adaptation of these principles to practical use I prefer to introduce the incoming mixture of sewage and sludge floc into the aerator near its top, and so conduct it through the tank that it travels downwardly more or less in countercurrent relation to the upwardly traveling air bubbles. The rate of oxygen absorption in water varies with the pressure, and therefore the rate of oxygen absorption in the liquid contained in the tank will be proportionately greater as the depth of the liquid increases. That is, as the sewage travels progressively toward the bottom of the aerator, it will be subjected to increasingly rapid oxidation because of the increasing concentration of the dissolved oxygen in the liquid. The rate of settling of the suspended solids in an aerated mixture of sewage and aerated sludge floc is also proportional to the degree of oxidation of such solids. And further, the effectiveness of sludge floc as an agent in the oxidation of raw sewage suspended solids is likewise proportional to the degree of oxidation of the sludge floc solids. It will be evident, therefore, that as the incoming sewage particles move progressively toward the bottom of the aerator, they are subjected to increasing rates of oxidation, insuring that the portions passing from the tank at the bottom are the most completely oxidized portions of any in the tank. Also, superimposed zones of sewage at increasing degrees of oxidation will be formed in the liquid in the aerator, with those most completely oxidized at the bottom of the tank. During operation, the rising air streams will tend to carry upwardly with them the immediately adjacent columns of mixed liquor, moving some of the more completely oxidized matter upwardly from the lower portion of the tank and locally disturbing the zones above mentioned to some extent, but in the more quiescent regions between the air streams the lesser oxidized matter will remain in the upper levels while any more completely oxidized matter moved upwardly as aforesaid, then moves downwardly again, so that only mixed liquor containing the more completely oxidized matter is removed from the lower zone of the tank.

Further objects and advantages of the invention will in part be obvious and in part specifically referred to in the description hereinafter contained, which, taken in conjunction with the accompanying drawings, discloses forms of apparatus which may be used to apply these principles to practical use.

In the drawings:

Fig. 1 is a central vertical section through an aerator constructed to be operable in accordance with this invention.

Fig. 2 is a schematic flow diagram, showing the grouping of sedimentation tanks and aerators which may be employed to provide the complete treatment of sewage by this method.

Fig. 3 is a vertical section through an aerator of modified form, in which baffling means are introduced to restrain the circulatory or spiral motion of the liquid column, and including a centrally disposed effluent duct for the passage of the liquid out of the tank from a point centrally located near the bottom.

Fig. 4 is a top plan view (with parts above the tank removed) of the aerator shown in Fig. 3, further illustrating one arrangement of baffle plates.

Fig. 5 is a top plan view of the form of aerator shown in Fig. 1.

Fig. 6 is a section on line 6—6 of Fig. 1, looking in the direction of the arrows.

Fig. 7 is a central vertical section of an aerator adapted to employ the principles of this invention in which a modified way of suspending and rotating the diffusion tubes is shown.

Fig. 8 is a top plan view of another form of aerator adapted to carry out the principles of this invention, in which the diffusing mediums are located in fixed position in the floor of the tank.

Fig. 9 is a central vertical section through the form of aerator shown in Fig. 8.

Referring more particularly to Fig. 1: the incoming sewage is preferably passed into the aerator tank 1 through an an intake channel or pipe 2 located near the top of the tank. The raw sewage entering the aerator at this point is usually mixed with a quantity of sludge withdrawn from a clarifier or final sedimentation tank, and in some processes small quantities of certain chemicals may be included according to well-known methods. In either event, the term "mixed liquor" is generally employed to refer to the contents of the aerator, and will be so used in this specification.

Air is passed into the tank at a point near its bottom or floor by means of a suitable diffuser mechanism which may consist of a number of porous diffusion tubes 3 arranged in radial arms extending out from a central stem 4 which may serve as the air supply pipe. In the particular construction illustrated, this stem 4 passes through a bearing 5 located somewhat above the diffuser members 3, this bearing being connected by struts 6 to the side wall of the tank to steady the mechanism during operation. As previously stated, the diffuser mechanism is preferably moved about through the lower region of the tank so as to distribute air uniformly through the various superimposed unit volumes of sewage contained in the tank. This may be accomplished, for example, by rotating the stem 4 in such manner that the arms 3 pass successively under all sectors or zones of the superjacent sewage, and therefore distribute the air equally thereto and at the same time cause thorough mixing of the sewage and sludge floc particles, due to the agitation or mixing caused by the rising column of air bubbles. In this form of the invention the hollow stem 4 is supported by thrust bearing 7 and is rotated by a suitable speed reducing gearing 8, driven in suitable manner. The supporting and driving mechanism is preferably located as shown above the water level in the tank and in turn may be supported by the walls of the tank. Compressed air is supplied through the stationary pipe 9, which communicates with the open upper end of stem 4 through a suitable mercury or similar frictionless liquid seal, indicated diagrammatically at 10 in this figure. A suitable outlet 11 may be provided to facilitate draining the contents of the tank, when desired. This form of aerator adapts itself well to use in systems of the continuous flow type, wherein the liquids which pass into the tank 1 through the channel 2 are continuously withdrawn from the tank through duct 12 and channel 13. The lower open end of duct 12 is preferably located as near the floor of the tank as possible. In Fig. 1 the tank has been shown as constructed with metal side walls and a concrete floor. However, it will be obvious that the entire tank and duct 12 may be constructed entirely of metal or entirely of concrete or other suitable materials.

The dotted vertical arrows 14 of Fig. 1 illustrate the path of the rising air bubbles emanating from the porous tubes 3 and passing upwardly through the liquid in the tank. The curved arrows 15 illustrate the passage of the liquid from the top of the tank to the bottom in a progressive and somewhat circuitous manner, as the rotation of the diffusing mechanism, however slow, may impart a slight rotary spiral flow motion to the liquid column unless restrained by baffles such as shown in my modified form of construction (Fig. 3). When diffusion mediums of conventional tubular form and construction are submerged in a liquid and provided with an adequate supply of air under suitable pressure, the air is emitted from the pores of the tubes at all points on the surface, with the result that the air bubbles forcibly ejected through these pores follow a path perpendicular to the surface of the tube for a short distance after leaving the tube. By locating these porous tubes close to the floor of the tank it will be apparent that the air ejected from the tubes through the under portions of the tube surfaces will impinge against the floor of the tank and effectively stir up any solids which may have deposited on the floor during the quiescent periods occurring during rotation of the tube assembly in the tank. This effectively minimizes sedimentation and consequent septicization, and also returns any such deposited solids into circulation throughout the contents of the tank, for the purposes described. In the construction shown, the liquid flowing upwardly through duct 12 passes from the tank and to another aerating tank or clarifier as the case may be, through channel 13, which is preferably an open top channel to facilitate cleaning, when necessary.

It is also preferable to have channels 13 with a semicircular or suitably curved bottom to insure reasonable scouring velocities and avoid sedimentation in the channel at low rates of flow, as for example in the early morning hours during which the sewage, in plants serving small communities particularly, may have relatively a very low rate of flow. It will be noted that a portion of the diffusing medium in each arm of the diffuser mechanism periodically passes under the open end of vertical outlet duct 12, thereby delivering a rising column of air bubbles through duct 12 to insure against the settlement of solids in the liquid passing through duct 12, and also preventing the accumulation of viscous lighter suspended solids on the sides of the duct.

In Fig. 2 I have shown a typical arrangement of tanks which may be used to purify sewage. Tank 16 at the left of Fig. 2 is of the type known as a primary sedimentation tank, in which the raw sewage, which may or may not be previously screened to a greater or lesser degree to remove the grosser solids, is delivered to the central compartment 17 through channel 18, passing downwardly in this compartment and upwardly through the concentrically disposed outer compartment 17a, and thence over the weir 19 into the channel 2 of the first of the series of aerators, as previously described in connection with Fig. 1. During the passage of the sewage through tank 16 at a low and decreasing velocity, a substantial portion of the settleable suspended solids are deposited upon the floor of the tank forming a sludge blanket of greater or lesser thickness. As this accumulation of sludge increases to sufficient proportions and it is desired to remove a portion thereof, a scraper mechanism indicated diagrammatically at 20 is rotated, and valve 21 is opened permitting the deposited sludge on the floor of the tank to pass out through duct 22 to sludge disposal facilities.

The partially clarified sewage passing over the weir 19 into the channel 2 is thence conducted as described through tanks 1, 1a and 1b, in sequence, passing from the last aerator 1b into channel 13a, and thence into the central compartment of the final sedimentation tank 23 at the right of Fig. 2, in which sedimentation and filtration occur. The clarified effluent passes out over a peripheral weir 24 into the final outlet channel 25.

The settled suspended solids in tank 23 differ in many respects from the settled solids in tank 16. Following the period of aeration in one or more aerating tanks 1, the suspended solids become more or less oxidized which changes their physical form and character. Sludge derived from aerated sewage, by reason of the character of its surface and the electrical charges on the surface of the particles, will agglomerate and form so-called flocs which will settle readily. As evident in various applications of the activated sludge process, and as described in my copending application Ser. No. 668,217, above referred to, this sludge may be used to advantage in expediting the rate of oxidation of colloidal and other suspended solids in raw sewage and the conversion of the unstable dissolved solids into more stable forms. The advantages of this method of clarification are apparent as it is axiomatic that a superior filtering medium may be obtained by employing materials taken from the liquid which is to be filtered. I have found in practice that a sludge blanket so formed provides a better filtering medium for the removal of suspended solids in the mixed liquor in this type of process than any other medium I have discovered. This practice enjoys the further advantage in that the filtering medium is automatically provided from the material to be filtered and surplus quantities collected or formed during the operation of the process may be discarded and disposed of in any suitable manner.

It is therefore preferable to permit the sludge blanket to accumulate in volume in tank 23, so that its upper surface is above the lower end of the walls of the central compartment 26, in order that the down-flowing sewage in central compartment 26 will first pass through this blanket in a downward direction, and thence in a transverse direction and later upwardly through the sludge blanket for the purpose of filtering out in the sedimentation filter thus formed, a greater quantity of suspended solids than would ordinarily be removed by plain sedimentation. The optimum predetermined depth of chamber 26 for plants designed for any specific optimum sludge density and other principles and applications of this procedure, is more adequately disclosed in my copending application Ser. No. 75,951 filed April 23, 1936 entitled "Method and apparatus for settling and filtering sewage liquors."

The advantages of returning sludge of this character for mixture with the raw sewage prior to aeration are broadly known, and to accomplish this I provide duct 28, pump 29 and duct 30 (Fig. 2), through which a constant stream of sludge collected in tank 23 is returned for mixture with the raw sewage in the conventional manner.

Tank 23 is provided with a sludge scraper mechanism 31, similar to that employed in tank 16, for the purpose of continuously moving the sludge settling on the floor of the tank, toward the central outlet 32, whence it passes through duct 28, pump 29 and duct 30 to channel 2 for mixture with the raw sewage prior to its entry to the first aerator, 1. Quantities of sludge in excess of that required for recirculation may be discarded from the system by opening valve 33 (Fig. 2) and passing such excess of sludge into an off-take duct 22. Operating mechanisms 8 and scrapers 20, 31, may be driven in any suitable manner (not shown in detail). Driving mechanism 35 for the sludge scraping mechanism in tank 16 is in general operated only during the operations of sludge withdrawal through valve 21 into discard duct 22.

In Fig. 2 I have shown three aeration tanks in series, but the number of tanks of course will vary with the requirements. The primary sedimentation tank 16 may be omitted and conventional forms of fine screens or primary filters used in lieu thereof. In some instances waste or excess aerated sludge from tank 23 may be delivered into tank 16, preferably at the entrance point 18, because of the agglomerating and adsorbing effect of aerated sludge in removing additional quantities of finely divided or colloidal suspended solids from the raw sewage and causing them to settle with the more highly oxidized aerated sludge for removal with the grosser solids normally settled in tank 16. When this practice is desirable, suitable ducts (not illustrated) may be arranged between valve 33 and channel 18 to deliver such excess sludge to influent channel of tank 16. I have shown air supply tube 36 as a common supply to each of the aerator tubes 9. However, I do not confine myself to this construction as individual air supply means may be provided, if desired.

In Figs. 3 and 4 I have shown a modified form of aerator, in which I similarly employ a rotating group of diffuser tubes 3 located in close proximity to the floor of the tank. In these figures I have shown one form of baffling arrangement including the vertical, radial baffle plates 37; these restrain the spiral movement of the liquid in the tank, to provide a more rapid shifting in position of the rotating diffuser mechanism 3 relative to the contents of the tank, and insure a greater frequency of agitation and aeration of different portions of the tank contents.

In Figs. 3 and 4 I have shown the outlet duct 12a concentrically located about the central driving tube 4 with an extension of the effluent channel 13b projecting inwardly through the tank and having open engagement with the top of tube 12a, in such manner that the liquid flowing into the tank through channel 2 passes downwardly to the lower regions of the tank, and thence out of the tank by passing upwardly through duct 12a and channel 13b. It will be noted that portions of the diffusing tubes 3 are located under the open end of outlet tube 12a, thereby providing a rising column of air bubbles through the tube to avoid the settlement of the suspended solids in the liquid passing upwardly therethrough.

Fig. 7 illustrates another form of construction particularly adapted to tanks of large diameter, which may be employed to facilitate the suspension of diffuser tubes in a position in close proximity to the floor of the tank, and provide a more uniform distribution of air to the various sections of diffuser tubing. In this form of construction I provide a bridge 38 spanning the tank and supported on wheels 39 running on track 40 located at or near the top of tank 1c. This bridge may have any selected number of radiating arms and associated supporting wheels 39, one or more of which wheels are driven from central driving mechanism 41, which may be of any suitable form adapted to the purpose. Suitably disposed on each arm of this bridge I provide a header 42 which is supplied with air under pressure from supply pipe 43 through mercury or other liquid seal 44. The air is distributed by means of this header to down pipes 45 and thence to the diffuser tubes 3c.

In Figs. 8 and 9 I have illustrated another modification of my invention, in which the same general principles are employed but in a specifically different way. According to the description of Figs. 1-7, the desideratum, the thorough agitation of the entire aerator contents and the equal delivery of air to all portions thereof, is accomplished by avoiding any great amount of horizontal movement of the liquid contents in passing through the tank, and moving the air diffusing means about in a horizontal plane in the lower regions of the tank. In Figs. 8 and 9 I accomplish the same desideratum and provide continuous mixing of all portions of the tank contents periodically, and agitate the suspended solids throughout the tank, diffusing them through the liquid contents in the desired manner and similarly distribute air through the entire contents of the tank, by maintaining the air diffusion means in a fixed position, and rotating the liquid contents of the tank above such diffusing means. In Fig. 9 I provide a driving mechanism 46 suitably supported on the tank, preferably above the water lever, and central driving tube 47, on which are positioned scraper arms 48 having suitably arranged thereon scrapers 49.

I also provide in the floor of the tank a group of diffusing mediums preferably in the form of stationary flat plates 54 of conventional form and character, such as now used in typical spiral flow tanks. These plates are located over air channels 50 and supplied with air through ducts 51. It will be noted that at least a portion of one diffuser plate is located under vertical outlet duct 12d as shown at 52 for the purposes previously described. I also provide drainage ducts 53 to facilitate the removal of moisture condensed from the air delivered to channels 50, and any water which may penetrate plates 54.

I also provide plates or vanes 55 preferably radially located about central driving shaft 47, and serving also as supports for arms 48. These vanes serve to impart a rotary or spiral direction of flow to the tank contents.

In operation, the mixed liquor as previously described enters the tank 1c through duct 2 at a point near the surface of the liquid. The rotation of the mechanism shown and described causes a horizontal spiral rotary flow of the liquid progressively downward through the tank. It will be evident that as the liquid rotates in the tank it is periodically brought above each row of diffuser plates. Air under pressure is delivered to the channel 50 under the diffuser plates and is projected upwardly through pores of the plates 54 forming a myriad of minute bubbles which immediately rise to the surface, passing through the column of liquid then immediately above the plate. It will be evident from the figures and description that each portion of the tank liquid contents is frequently and periodically agitated and aerated in this manner. The scraper arms 48 and associated scrapers 49 may be of any suitable design and construction, but preferably so arranged that the solids settling in the sectors of the floor between the rows of diffuser plates will be moved coincidentally toward the transverse row of diffuser plates and toward the center of the tank, where (in the case of the construction shown in Figs. 8 and 9) the rate of agitation and aeration will be higher than in the peripheral zones of the tank. In a manner similar to that previously described, the lighter and lesser oxidized suspended solids in the sewage-sludge mixture will settle more slowly during the passage of the liquid over the unaerated sections of the tank wall; and the more highly oxidized solids will settle more rapidly. Because of this fact a stratified arrangement of solids will be continually maintained in the tank contents, the lesser oxidized solids remaining nearer the surface and the more highly oxidized solids settling to the lower region of the tank, thereby carrying out one of the principal advantages of my invention, which is, providing an increasing degree of oxidation as the sewage progresses through one or more aerators of this character, to insure that the suspended solids will settle at the desired rate in the final sedimentation tank or clarifier and create a sludge of suitable quality and density to more efficiently perform its functions in the purification of additional quantities of sewage.

It will be evident that the apparatus used in carrying out my invention is readily adaptable to the structural and first cost economies of steel plate construction, in contrast with the concrete tanks now generally used for this purpose. Obviously, it is not essential that cylindrical tanks be employed, as hexagonal or octagonal tanks, or even square tanks, will represent very little loss in efficiency as compared with cylindrical tanks because of the disturbance of a relatively wide area of liquid about each rising column of air bubbles and the consequent diffusion of oxygen and suspended solids throughout a relatively wide zone adjacent such columns of rising air bubbles. Steel construction offers many additional advantages because of the rapidity of construction afforded under all weather conditions, some of which seriously frequently impede the construction of concrete tanks and mitigate against the quality of construction thereof.

In each of the above-described forms of the invention, the mixed liquor to be treated travels in a general way through the tank in a path opposed to the travel of the air, although in some instances other components of motion may be present; I have used the expression "countercurrent relation" in a loose sense as comprehending conditions of the above character. Also reference to "air" in the specification and claims should be understood as comprehending the use of oxygen containing gases with or without the admixture therewith of other neutral or reactive gas. And while I have confined this description largely to a consideration of the requirements of the oxidized sludge process as disclosed in my above-mentioned copending application Ser. No. 668,217, or its predecessor, the activated sludge process, it will be evident that it is equally adaptable to any process of sewage treatment in which the aeration and agitation of a mixture of sewage, and sludge or chemicals is required and in which the progressive increase of the rate of mixture and the various chemical reactions increases the efficiency of the process either by shortening the time of aeration, resulting in smaller tanks and a lower compressed air requirement, or the more complete consummation of the reactions involved.

Although the invention has been disclosed by reference to certain specific steps of procedure as carried out by certain apparatus, it should be understood that changes may be made in such procedure and apparatus without departing from the spirit of the invention in its broader aspects, within the scope of the appended claims.

What I claim as new and desire to secure by Letters Patent is:

1. The method of treating sewage mixed liquor containing oxidizable matter including previously aerated solids in suspension, which comprises feeding the mixed liquor into a tank near its top, passing air through a diffuser, moving the diffuser through the lower region of the tank so as to underlie different superjacent columns of mixed liquor in the tank and cause the air to bubble upwardly therethrough to progressively oxidize oxidizable matter in the mixed liquor, passing the mixed liquor downwardly through the tank in countercurrent relation to the path of air travel, and withdrawing the mixed liquor containing oxidized matter from the tank near its bottom.

2. The method of treating sewage mixed liquor containing oxidizable matter including previously aerated solids in suspension, which comprises feeding the mixed liquor into a tank near its top, passing the mixed liquor downwardly through the tank in a spirally directed path, bubbling air upwardly through certain portions of the tank to oxidize oxidizable matter in the mixed liquor, and withdrawing the mixed liquor containing oxidized matter from the tank near its bottom.

3. The method of treating sewage mixed liquor containing oxidizable matter including previously aerated solids in suspension, which comprises feeding the mixed liquor into a tank near its top, injecting air under pressure into the mixed liquor contained within said tank near the bottom thereof, passing air so injected in an upward path of travel through the tank to oxidize oxidizable matter in the mixed liquor, maintaining the lesser oxidized matter in the mixed liquor in upper levels in said tank, and progressively moving said oxidizable matter in a downward path of travel through the tank in countercurrent relation to the flow of air, as the degree of oxidation of said matter increases, altering one of the aforesaid paths of travel with respect to the other, to cause different portions of the mixed liquor passing through the tank to be successively aerated, and withdrawing the mixed liquor containing the more completely oxidized matter from the tank near its bottom, the rate of outflow of the mixed liquor from near the bottom of the tank being substantially equal to the rate of feed of the mixed liquor into the tank.

4. The method of treating sewage mixed liquor containing oxidizable matter including previously aerated solids in suspension, which comprises feeding the mixed liquor into a tank near its top, passing the mixed liquor through the tank in a downwardly directed path of travel, passing air through the tank in an upwardly directed path of travel to oxidize oxidizable matter in the mixed liquor, altering one of said paths of travel with respect to the other to cause different portions of the mixed liquor passing through the tank to be successively aerated, and withdrawing the mixed liquor containing oxidized matter from the tank near its bottom.

5. Apparatus of the class described for oxidizing sewage mixed liquor, including a tank, means for feeding mixed liquor to be oxidized into the tank near its top, an air-diffusing mechanism disposed near the bottom of said tank and underlying the main body of mixed liquor when the latter is within the tank, an offtake conduit for oxidized mixed liquor communicating with the space within the tank near its bottom, and disposed in position to receive air bubbles rising upwardly from said air-diffusing mechanism.

6. Apparatus of the class described for oxidizing sewage mixed liquor, including a tank, means for feeding mixed liquor containing matter to be oxidized into the upper portion of said tank, means for producing a spiral downwardly directed path of travel for said mixed liquor through said tank, means for withdrawing oxidized mixed liquor from the tank near its bottom, and stationary air-diffusing mechanism disposed near the bottom of said tank.

7. Apparatus of the class described for oxidizing sewage mixed liquor, including a tank, means for feeding mixed liquor containing matter to be oxidized into the upper portion of said tank, an agitating mechanism in said tank which mechanism is constructed to rotate about a substantially vertical axis and produce a spiral path of travel of the mixed liquor through the tank, means for withdrawing oxidized mixed liquor from the tank near its bottom, and a stationary air-diffusing mechanism disposed in the lower region of said tank.

8. Apparatus of the class described for oxidizing sewage mixed liquor, including a tank, means for feeding mixed liquor containing matter to be oxidized into the upper portion of said tank, an air-diffusing mechanism for said tank having porous members extending substantially radially across the space within the tank near the bottom thereof, a plurality of air conducting members extending downwardly in said tank and connected to supply air to said porous members at points spaced radially along the latter, said last mentioned members supporting the porous members in operative position, means for rotating said porous members and air conducting members about a substantially vertical axis, and means for withdrawing aerated mixed liquor from said tank near its bottom.

9. The combination of claim 8 wherein said air conducting members are connected to an air supply header disposed at the top of the tank and rotatably communicating with an air supply pipe located substantially in the axis of rotation of the air diffusing mechanism.

10. Apparatus of the class described for oxidizing sewage mixed liquor, including a tank, means for feeding mixed liquor containing matter to be oxidized into the upper portion of said tank, an air-diffusing mechanism for said tank having porous members extending crosswise within the tank near the bottom thereof, a plurality of air conducting members extending downwardly in said tank and connected to supply air to said porous members at points spaced longitudinally along the latter, a rotary supporting structure for said diffusing mechanism and air conducting members, said supporting structure overlying the tank, means for rotating said supporting structure about a substantially vertical axis, thereby to move said air-diffusing mechanism and air-conducting members angularly within the tank, and means for withdrawing aerated mixed liquor from said tank near its bottom.

11. The method of treating sewage mixed liquor containing oxidizable matter including previously aerated solids in suspension, which comprises feeding the mixed liquor into a tank near its top, injecting air under pressure into the mixed liquor contained within said tank near the bottom thereof, passing air so injected upwardly through the tank to oxidize oxidizable matter in the mixed liquor, maintaining the lesser oxidized matter in the mixed liquor in upper levels in said tank, and progressively moving said oxidizable matter downwardly in the tank in countercurrent relation to the upward flow of air, as the degree of oxidation of said matter increases, and withdrawing the mixed liquor containing the more completely oxidized matter from the tank near its bottom, the rate of outflow of the mixed liquor from near the bottom of the tank being substantially equal to the rate of feed of the mixed liquor into the tank.

12. Apparatus of the class described for oxidizing sewage mixed liquor containing previously aerated solids in suspension, including a tank, means for feeding mixed liquor to be oxidized into said tank near its top, means located in the lower region of the tank and acting substantially uniformly with respect to the various portions of the column of mixed liquor in the tank for passing air upwardly therethrough to oxidize the mixed liquor, the upper portion of said tank being constructed and arranged to prevent the outflow of mixed liquor from upper levels in the tank, thereby to maintain lesser oxidized matter in such upper levels, and means for withdrawing the more completely oxidized mixed liquor from the tank near its bottom, whereby the mixed liquor passes in a downward direction in countercurrent relation to the upwardly passing air bubbles, and the oxidizable matter passes progressively downward as its degree of oxidation increases.

13. Apparatus of the class described for oxidizing sewage mixed liquor containing previously aerated solids in suspension, including a tank, means for feeding mixed liquor to be oxidized into said tank near its top, means located in the lower region of the tank and acting substantially uniformly with respect to the various portions of the column of mixed liquor in the tank for passing air upwardly therethrough to oxidize the mixed liquor, the upper portion of said tank being constructed and arranged to prevent the outflow of mixed liquor from upper levels in the tank, thereby to maintain lesser oxidized matter in such upper levels, and means for withdrawing the more completely oxidized mixed liquor from the tank near its bottom, whereby the mixed liquor passes in a downward direction in countercurrent relation to the upwardly passing air bubbles, and the oxidizable matter passes progressively downward as its degree of oxidation increases, said air passing means being adjustable in position to underlie different portions of the space within the tank.

EDWARD B. MALLORY.